No. 664,270. Patented Dec. 18, 1900.
P. HUEBNER.
STEAM ENGINE.
(Application filed Apr. 30, 1900.)
(No Model.)
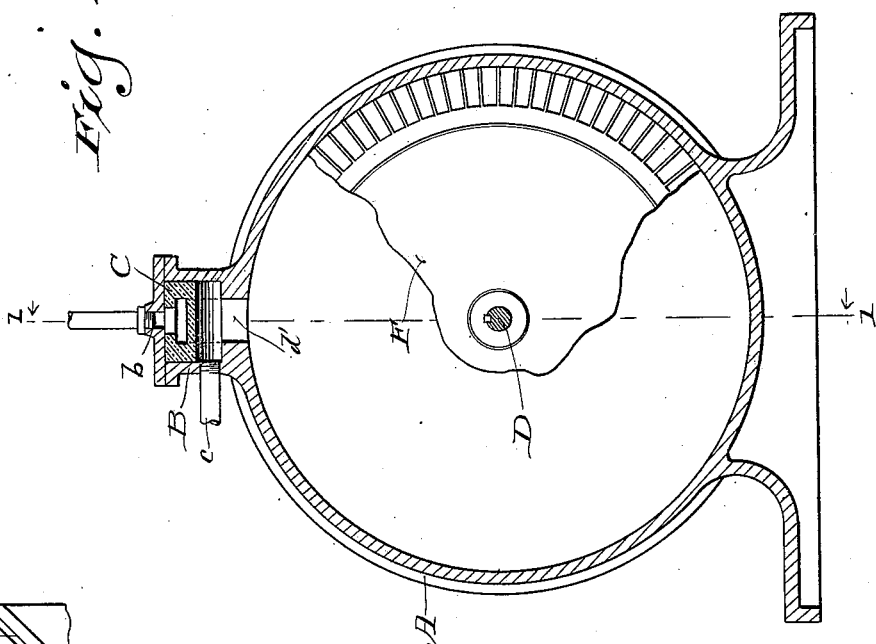
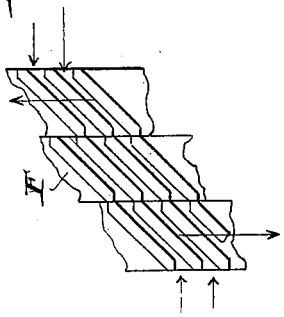
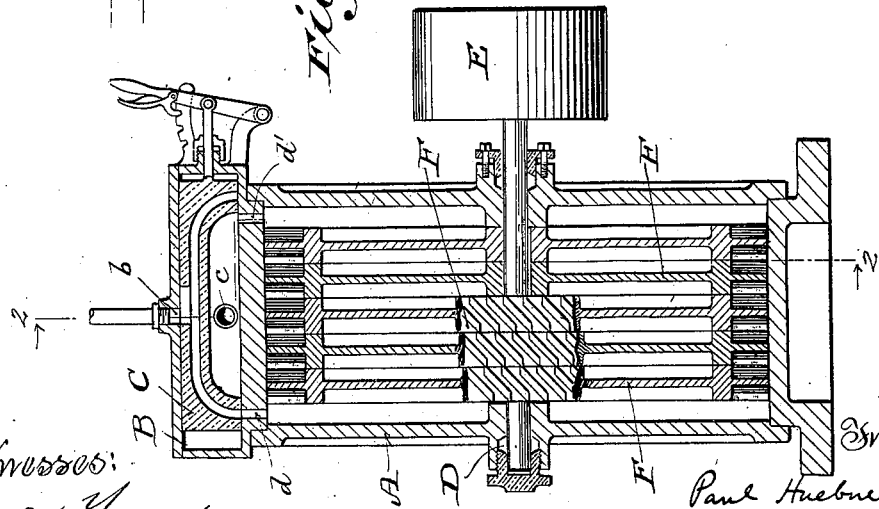
Witnesses:
Geo. W. Young.
N. E. Oliphant.
Inventor
Paul Huebner.
By H. G. Underwood.
Attorneys
THE NORRIS PETERS CO., PHOTO-LITHO., WASHINGTON, D. C.

UNITED STATES PATENT OFFICE.

PAUL HUEBNER, OF MILWAUKEE, WISCONSIN.

STEAM-ENGINE.

SPECIFICATION forming part of Letters Patent No. 664,270, dated December 18, 1900.

Application filed April 30, 1900. Serial No. 14,872. (No model.)

*To all whom it may concern:*

Be it known that I, PAUL HUEBNER, a citizen of the United States, and a resident of Milwaukee, in the county of Milwaukee and State of Wisconsin, have invented certain new and useful Improvements in Steam-Engines; and I do hereby declare that the following is a full, clear, and exact description thereof.

My invention has for its object to provide simple, economical, and efficient preferably reversible turbine-type steam-engines; and it consists in certain peculiarities of construction and combination of parts hereinafter particularly set forth with reference to the accompanying drawings and subsequently claimed.

Figure 1 of the drawings represents what is for the most part a sectional view of one of my reversible turbine-type steam-engines on the plane indicated by line 1 1 in the succeeding figure, part of some of a series of disks appearing in this view being in face elevation; Fig. 2, another sectional view of the engine indicated by lines 2 2 in the preceding figure, a portion of one of the disks appearing in side elevation; and Fig. 3, a detail face elevation, on an enlarged scale, of parts of a plurality of the aforesaid disks.

Referring by letter to the drawings, A indicates a cylinder surmounted by a casing B, in which a lever-and-latch-controlled channeled slide-valve C has its play. The casing is provided with a live-steam-inlet port $b$ in communication with the slide-valve channel, and said casing is also provided with a port $c$ for the escape of the exhaust-steam. The casing has communication with the cylinder through ports $d$ $d'$, governed by the slide-valve, and while I have shown slide-valve mechanism for controlling the inlet and exhaust of steam with reference to the cylinder it is practical to substitute rocker-valve mechanism for the same purpose.

The heads of the cylinder are provided with bearings for a shaft D, herein shown as having a drive-pulley E thereon, and fast on the shaft, within the cylinder, are a series of disks F, each of which is grooved at regular intervals of its periphery crosswise of the face at an angle of approximately forty-five degrees, the grooves being of the same depth throughout the series. The blades between the grooves are preferably beveled at each terminal to obtain the steam-clearance herein shown, and the several disks are positioned on shaft D so as to provide for registration of their grooves throughout the series.

The number and arrangement of the disks F on shaft D is such that steam-space is had between end disks of the series and the heads of the cylinder that is otherwise filled by said disks. However, it may be found practical to substitute a grooved drum in place of a series of the aforesaid disks so arranged on the engine-shaft as to virtually constitute such a drum.

In practice, the valve C being set as shown in Fig. 1, live steam enters the cylinder through port $d$ and exerts itself through the disk grooves against the disk blades to run the engine in one direction, after which it passes from said cylinder through port $d'$ and finally escapes through port $c$ of the valve-casing. Now if the valve be shifted so that the live steam will enter the cylinder through port $d'$ and pass out at port $d$ said steam will exert itself through the disk grooves upon the disk blades to run the engine in a direction reverse to that above described, and it is obvious that said valve may be adjusted to close both parts $d$ $d'$ aforesaid.

In practice two or more engines similar to the one herein set forth may be connected so that steam from one shall pass on into another throughout the series, the disks in all being upon a continuous shaft, and connections provided whereby the valves of the several engines may work in harmony. It is also to be understood that an engine similar to the one above specified may be organized to run in but one direction.

Having thus described my invention, what I claim as new, and desire to secure by Letters Patent, is—

1. A steam-engine comprising a cylinder, a shaft for which the cylinder-heads are provided with bearings, an annular device that being fast on the shaft within the cylinder in position to provide for steam-spaces adjacent to said heads is grooved at intervals of its periphery at an angle crosswise of its face, the depth of the grooves being the same throughout the series, and valve mechanism controlling ports in register with the steam-spaces aforesaid.

2. A steam-engine comprising a cylinder, a shaft for which the cylinder-heads are provided with bearings, an annular device comprising a series of disks fast on the shaft within the cylinder in position to provide for steam-spaces adjacent to said heads, each disk being grooved at intervals of its periphery at an angle crosswise of its face, the depth of the grooves being the same in all disks with the latter arranged to provide for registration of their grooves throughout the series, and valve mechanism controlling ports in register with the steam-spaces aforesaid.

3. A steam-engine comprising a cylinder, a shaft for which the cylinder-heads are provided with bearings, an annular device comprising a series of disks fast on the shaft within the cylinder in position to provide for steam-spaces adjacent to said heads, each disk being grooved at intervals of its periphery at an angle crosswise of its face the depth of the grooves being the same in all disks with the latter arranged to provide for registration of their grooves throughout the series, the terminals of the blades between grooves being beveled to provide for steam-clearance, and valve mechanism controlling ports in register with the steam-spaces aforesaid.

In testimony that I claim the foregoing I have hereunto set my hand, at Milwaukee, in the county of Milwaukee and State of Wisconsin, in the presence of two witnesses.

PAUL HUEBNER.

Witnesses:
N. E. OLIPHANT,
B. C. ROLOFF.